(12) United States Patent
Adams (10) Patent No.: US 7,672,749 B1
(45) Date of Patent: Mar. 2, 2010

(54) METHOD AND APPARATUS FOR HIERARCHICAL PROCESS CONTROL

(75) Inventor: Ernest D. Adams, Austin, TX (US)

(73) Assignee: GlobalFoundries, Inc., Grand Cayman (KY)

( * ) Notice: Subject to any disclaimer, the term of this patent is extended or adjusted under 35 U.S.C. 154(b) by 133 days.

(21) Appl. No.: 11/303,103

(22) Filed: Dec. 16, 2005

(51) Int. Cl.
*G06F 19/00* (2006.01)

(52) U.S. Cl. .................... 700/121; 700/67; 700/169

(58) Field of Classification Search ........... 700/121, 700/67, 169; 706/13–17; 717/106, 114, 717/116

See application file for complete search history.

(56) References Cited

U.S. PATENT DOCUMENTS

| | | | | |
|---|---|---|---|---|
| 5,014,208 | A * | 5/1991 | Wolfson | 700/99 |
| 5,408,405 | A * | 4/1995 | Mozumder et al. | 700/31 |
| 5,757,648 | A * | 5/1998 | Nakamura | 700/169 |
| 6,197,604 | B1 * | 3/2001 | Miller et al. | 438/14 |
| 6,304,999 | B1 * | 10/2001 | Toprac et al. | 716/4 |
| 6,728,587 | B2 * | 4/2004 | Goldman et al. | 700/108 |
| 6,794,299 | B1 * | 9/2004 | Markle et al. | 438/710 |
| 6,801,817 | B1 * | 10/2004 | Bode et al. | 700/97 |
| 6,842,659 | B2 * | 1/2005 | Parikh et al. | 700/121 |
| 6,901,984 | B1 * | 6/2005 | Chang | 156/351 |
| 2002/0165636 | A1 * | 11/2002 | Hasan | 700/121 |
| 2002/0193902 | A1 * | 12/2002 | Shanmugasundram et al. | 700/121 |
| 2002/0199082 | A1 * | 12/2002 | Shanmugasundram et al. | 712/208 |
| 2003/0014145 | A1 * | 1/2003 | Reiss et al. | 700/121 |
| 2003/0180972 | A1 * | 9/2003 | Al-Bayati et al. | 438/14 |
| 2003/0220708 | A1 * | 11/2003 | Sahin et al. | 700/121 |
| 2004/0200574 | A1 * | 10/2004 | Davis et al. | 156/345.1 |
| 2006/0184264 | A1 * | 8/2006 | Willis et al. | 700/108 |
| 2006/0250617 | A1 * | 11/2006 | Donkelaar et al. | 356/500 |

OTHER PUBLICATIONS

Mason et al., "Maximizing delivery performance in semiconductor wafer fabrication facilities", Proceedings of the 2000 Winter Simulation Conference.*

* cited by examiner

*Primary Examiner*—Paul L Rodriguez
*Assistant Examiner*—Carlos Ortiz Rodriguez
(74) *Attorney, Agent, or Firm*—Williams, Morgan & Amerson, P.C.

(57) ABSTRACT

The present invention provides a method and apparatus for hierarchical process control. The method includes accessing at least one first metric indicative of processing performed on a wafer by a plurality of tool groups. The method also includes providing at least one tool group parameter to each of the plurality of tool groups based on the at least one first metric and accessing a plurality of second metrics. Each second metric is associated with a corresponding one of the plurality of tool groups and is indicative of processing performed on the wafer by the plurality of tools in the corresponding tool group. The method further includes providing at least one tool parameter to at least one tool in each of the plurality of tool groups based on the second metric associated with the tool group and the at least one tool group parameter provided to the tool group.

27 Claims, 4 Drawing Sheets

METHOD AND APPARATUS FOR HIERARCHICAL PROCESS CONTROL

BACKGROUND OF THE INVENTION

1. Field of the Invention

This invention relates generally to the field of semiconductor device manufacturing and, more particularly, to a method and apparatus for hierarchical process control.

2. Description of the Related Art

To fabricate a semiconductor device, a wafer is typically processed through numerous processing tools in a predetermined sequence. The processing tools may include photolithography steppers, etch tools, deposition tools, polishing tools, rapid thermal anneal tools, ion implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. The tool sequence, as well as the recipes used by the tools, must be carefully controlled so that the features formed on the wafer meet appropriate design and performance criteria. Thus, advanced process control (APC) systems are often used to coordinate operation of the processing tools.

Individual tools may be controlled using feedback and/or feed forward techniques. For example, tool sensors may be used to sense conditions or process parameters in the tool. A controller may then determine one or more inputs so that the conditions and/or process parameters of the tool remain within a selected tolerance of one or more target values associated with the conditions and/or process parameters. The determined inputs are then fed back or fed forward to the appropriate tool, which may use the determined inputs to process one or more wafers. For another example, a metrology tool may be used to measure one or more parameters of a wafer processed in a tool. The measured parameters may be compared to target values of the measured parameters and the comparison may be used to adjust an operating recipe of the tool.

Controlling tools using conventional feedback and/or feed forward techniques may become cumbersome as the number of tools in a production line and/or fabrication facility increase. Moreover, conventional feedback and/or feed forward techniques may not adequately account for errors or deviations from desired targets caused by the interaction of processes performed by different tools. These types of errors and/or deviations from desired target values may increase significantly as the number of tools in the production line and/or fabrication facility increases.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for hierarchical process control. The method includes accessing at least one first metric indicative of processing performed on a wafer by a plurality of tool groups. The method also includes providing at least one tool group parameter to each of the plurality of tool groups based on the at least one first metric and accessing a plurality of second metrics. Each second metric is associated with a corresponding one of the plurality of tool groups and is indicative of processing performed on the wafer by the plurality of tools in the corresponding tool group. The method further includes providing at least one tool parameter to at least one tool in each of the plurality of tool groups based on the second metric associated with the tool group and the at least one tool group parameter provided to the tool group.

In another embodiment of the present invention, an apparatus is provided for hierarchical process control. The apparatus includes at least one first controller configured to access at least one first metric indicative of processing performed on a wafer by a plurality of tool groups. The first controller is also configured to provide at least one tool group parameter to each of the plurality of tool groups based on the at least one first metric. The apparatus also includes a plurality of second controllers communicatively coupled to at least one first controller. The second controllers are configured to access a plurality of second metrics that are associated with a corresponding one of the plurality of tool groups. Each second metric is indicative of processing performed on a wafer by the plurality of tools in the corresponding tool group. The second controllers are also configured to provide at least one tool parameter to at least one tool in each of the plurality of tool groups based on the second metric associated with the tool group and the at least one tool group parameter provided to the tool group.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
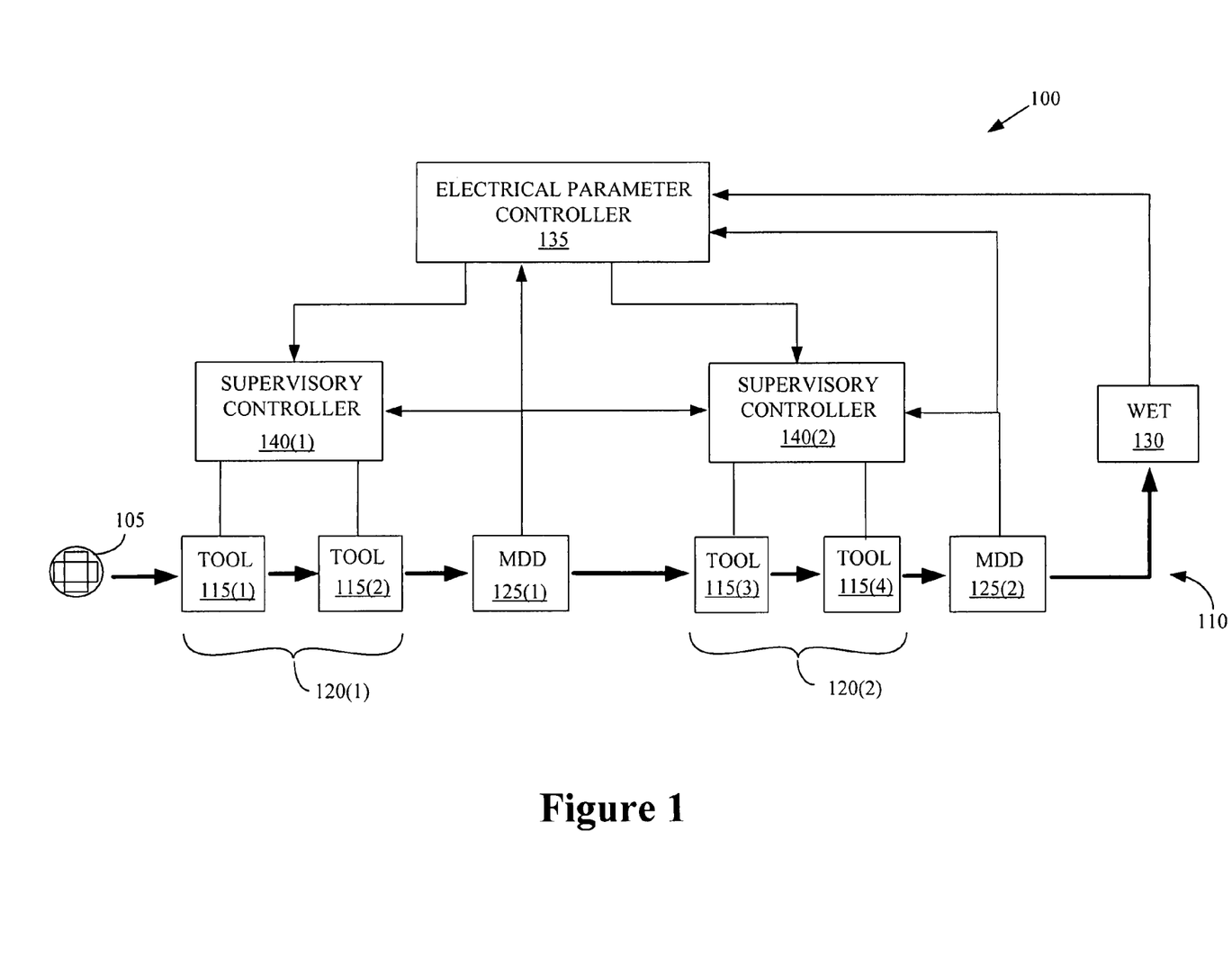
FIG. 1 conceptually illustrates one exemplary embodiment of a system for processing a semiconductor wafer, in accordance with the present invention.

Referring now to FIG. 1, one exemplary embodiment of a system 100 for processing a semiconductor wafer 105 is shown. Although a single wafer 105 is pictured in FIG. 1, it is to be understood that the wafer 105 is representative of a single wafer as well as a group of wafers, e.g. all or a portion of a wafer lot that may be processed in the system 100. The system 100 includes a processing line 110. In the illustrated embodiment, the process flow of the wafer 105 through the processing line 110 is indicated by boldfaced arrows. However, the present invention is not limited to the particular processing line 110 shown in FIG. 1. In alternative embodiments, processing lines 110 including more or fewer elements, as well as alternate processing flows through these elements, may be used. Persons of ordinary skill in the art should appreciate that techniques for processing the wafer 105 in the processing line 110 are known in the art and so only those aspects of the processing that are relevant to the present invention will be discussed herein.

The processing line 110 includes a plurality of processing tools 115(1-4). In various embodiments, the tools 115(1-4) may include any desirable semiconductor processing tool, metrology tool, electrical test tool, and the like. Examples of tools 115(1-4) may include, but are not limited to, an etching tool, a photolithography tool, a polishing tool, a planarization tool, a thin-film tool, a deposition tool, an implantation tool, an ellipsometer, a scatterometer, a wafer electrical test unit, and the like. The tools 115(1-4) may be stand-alone tools or integrated tools capable of performing a number of different processing, metrology, and/or testing steps on the wafer 105.

The tools 115(1-4) are combined into a plurality of tool groups 120(1-2). Each tool group 120(1-2) may also be referred to as a "virtual tool." As will be discussed in detail below, the tools 115(1-4) may be combined into tool groups 120(1-2) based on any desirable grouping criteria. The number of tools 115(1-4) in each tool group 120(1-2), the number of tool groups 120(1-2), and the overall number of tools 115(1-4) in the processing line 110 are matters of design choice. Thus, persons of ordinary skill in the art should appreciate that the embodiment including four tools 115(1-4) combined into two tool groups 120(1-2) shown in FIG. 1 is intended to be illustrative and not to limit the present invention.

Each tool group 120(1-2) is associated with a metric determination device (MDD) 125(1-2). Each metric determination device 125(1-2) is configured to determine at least one metric that is indicative of processing performed on the wafer 105 by the plurality of tools 115(1-4) in the corresponding tool group 120(1-2). In the illustrated embodiment, the metric determination devices 125(1-2) are part of the processing line 110 and the wafer 105 is provided to the metric determination device 125(1-2). For example, if the tool 115(1) is a deposition tool and the tool 115(2) is a planarization tool used to planarize material deposited by the deposition tool, the metric determination device 125(1) may be an ellipsometer that may be used to measure a thickness of the planarized deposited layer, i.e. the metric determined by the metric determination device 125(1) is the thickness of the planarized deposited layer. Other illustrative examples of a metric determination device 125(1) include, but are not limited to, a profilometer, a scatterometer, a scanning electron microscope, and the like.

However, the metric determination devices 125(1-2) need not be measurement devices, nor must they be a part of the processing flow of the processing line 110. In one alternative embodiment, one or more of the metric determination devices 125(1-2) may be a computing device able to access information indicative of processing performed on the wafer 105 by the plurality of tools 115(1-4) in the corresponding tool group 120(1-2). This information may be accessed from one or more of the tools 115(1-4), from a memory or buffer (not shown) in the system 100, or from any other desirable location. The metric determination devices 125(1-2) may then form a metric indicative of the processing performed on the wafer 105 using the accessed information. For example, if the tool 115(1) is a deposition tool and the tool 115(2) is a planarization tool used to planarize material deposited by the deposition tool, the metric determination device 125(1) may be a computing device that may access a deposition time used by the deposition tool and a planarization time used by the planarization tool. The metric determination device 125(1) may then calculate a thickness of the planarized deposited material using the deposition time and a planarization time.

A wafer electrical test (WET) unit 130 is also included in the embodiment of the processing line 110 shown in FIG. 1. The wafer electrical test unit 130 may be used to perform one or more electrical tests on the processed wafer 105. In one embodiment, the wafer electrical tests may include measurements of currents and/or voltages between various nodes formed on the processed wafer 105 or individual chips therefrom. Alternatively, the wafer electrical tests may include one or more logical tests applied to logic circuits formed on the processed wafer 105. However, persons of ordinary skill in the art should appreciate that the end-of-line testing is not limited to testing by the wafer electrical test unit 130. In alternative embodiments, any desirable type of testing, such as metrology, may be used in place of or in addition to the electrical testing performed by the wafer electrical test unit 130.

The wafer electrical test unit 130, as well as any other end-of-line testing units that may be present, provides information indicative of processing performed on the wafer 105 by the tools 115(1-4) to a controller 135. In the illustrated embodiment, the controller 135 is an electrical parameter controller 135 that controls operations of portions of the system 100 based, at least in part, on information provided by the wafer electrical test unit 130. However, persons of ordinary skill in the art should appreciate that the present invention is not limited to the electrical parameter controller 135. In alternative embodiments, any desirable type of controller 135 may be implemented in the system 100.

The electrical parameter controller 135 determines one or more tool group parameters based, at least in part, on the information provided by the wafer electrical test unit 130. In one embodiment, the tool group parameters include target values of the metrics determined by the metric determination devices 125(1-2). The electrical parameter controller 135 may determine the tool group parameters using a model that relates the information provided by the wafer electrical test unit 130 to the tool group parameters. For example, the information provided by the wafer electrical test unit 130 may include one or more measured electrical parameters. The model may compare the measured electrical parameters to one or more desired target values and then determine one or more tool group parameters in an attempt to bring the measured electrical parameters closer to one or more of the desired target values in future processing. In one embodiment, the electrical parameter controller 135 may also receive information provided by one or more of the metric determination devices 125(1-2) and may use this information to determine one or more of the tool group parameters.

Supervisory controllers 140(1-2) can access the tool group parameters determined by the controller 135 and use the tool group parameters to control operations of tools 115(1-4) in the associated tool groups 120(1-2). For example, the supervisory controllers 140(1-2) may access the target values of the metrics determined by the metric determination devices 125 (1-2). The supervisory controllers 140(1-2) may then determine one or more tool parameters, such as the parameters of the tool operating recipe or the operating recipe itself, using the target values of the metrics. For example, the supervisory controllers 140(1-2) may compare the metrics determined by the metric determination devices 125(1-2) with the target values and determine one or more tool parameters based on the comparison. In one embodiment, a model may be used to determine a one or more tool parameters. Examples of tool parameters include, but are not limited to, processing times, temperatures, pressures, gas concentrations, flow rates, ion densities, and the like.

In one embodiment, one or more of the metric determination devices 125(1-2) may feed forward information to other supervisory controllers 140(1-2). For example, the metric determination devices 125(1) may feed forward information indicative of processing of the wafer 105 carried out in the tool group 120(1) to the supervisory controller 140(2). The supervisory controller 140(2) may then use the fed forward information indicative of processing of the wafer 105 carried out in the tool group 120(1) to determine one or more tool parameters that may be provided to the tools 115(3-4). In some embodiments, one or more of the metric determination devices 125(1-2) may provide information to the electrical parameter controller 135, which may use this information to determine the tool group parameters.

Although the hierarchical process control system 100 shown in FIG. 1 includes two levels of hierarchy, e.g., a first level including the supervisory controllers 140(1-2) and a second level including the electrical parameter controller 135, the present invention is not limited to two levels of hierarchy. Persons of ordinary skill in the art having benefit of the present disclosure should appreciate that the system 100 may include any additional number of hierarchy levels that may include any number of controllers. Furthermore, the levels of hierarchy shown in FIG. 1 may include additional supervisory controllers 140(1-2) and/or electrical parameter controllers 135. In embodiments that include additional levels of hierarchy, feedback and/or feed forward information may be exchanged between the various levels of the hierarchy and used to form various metrics and/or parameters, as discussed above.

Figure 2:
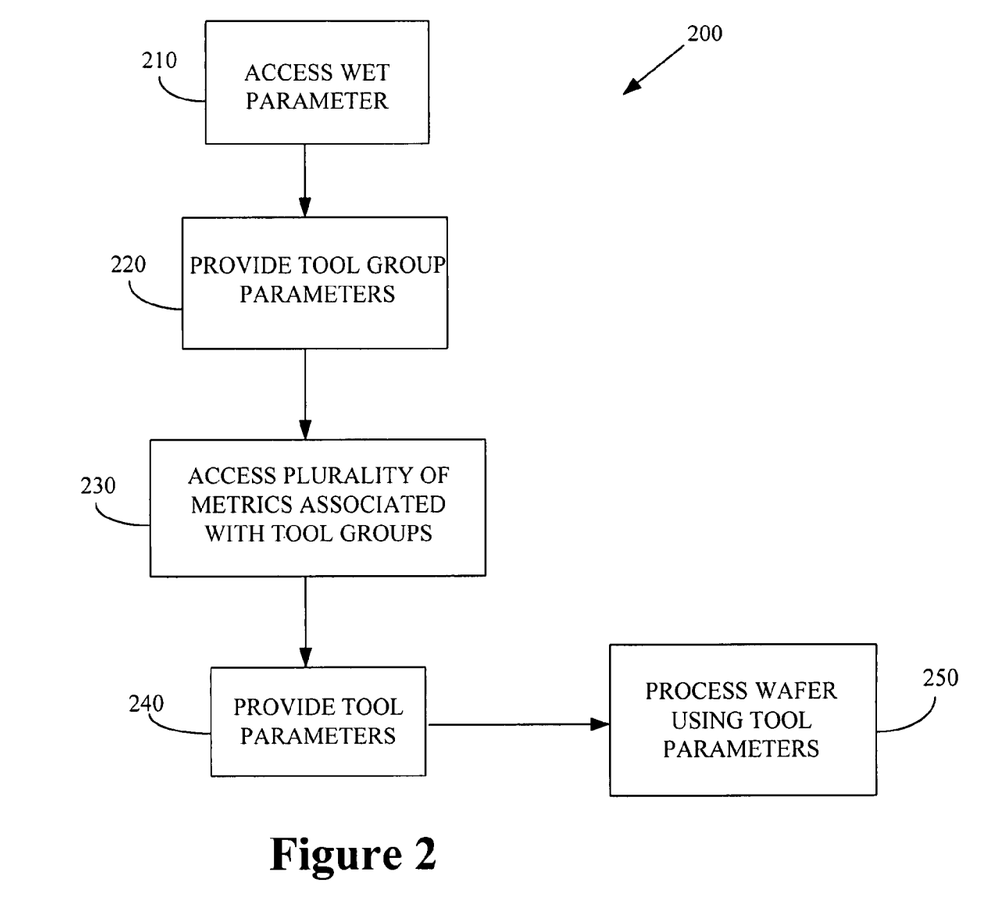
FIG. 2 conceptually illustrates one exemplary method of hierarchical process control that may be implemented in the system shown in FIG. 1, in accordance with the present invention.

FIG. 2 conceptually illustrates one exemplary method 200 of hierarchical process control that may be implemented in the system 100 shown in FIG. 1. The method 200 will be discussed with reference to one exemplary embodiment of a processed wafer 300 shown in FIGS. 3 and 4, but persons of ordinary skill in the art should appreciate that this embodiment is intended to be illustrative and that the present invention is not limited to this embodiment. In the illustrated embodiment, at least one wafer electrical test (WET) parameter is accessed (at 210) by, for example, the electrical parameter controller 135 shown in FIG. 1.

Figure 3:
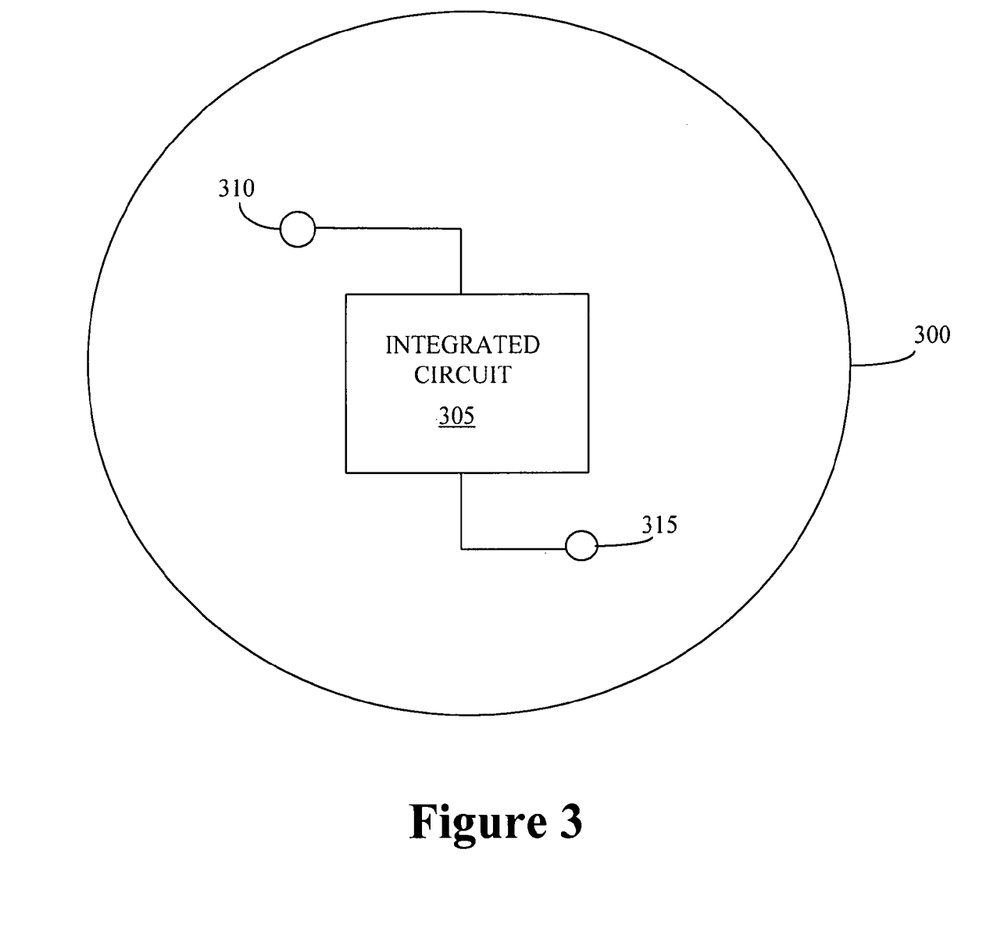
FIG. 3 conceptually illustrates one embodiment of an integrated circuit formed above a wafer.

FIG. 3 conceptually illustrates one embodiment of an integrated circuit 305 formed above the wafer 300. The integrated circuit 305 may contain a variety of structures such as transistors, capacitors, diodes, resistors, capacitors, and the like, which may be connected to allow the integrated circuit 305 to perform any desirable function. Persons of ordinary skill in the art should appreciate that the structure and/or function of the integrated circuit is a matter of design choice and not material to the present invention. Moreover, any desirable number of integrated circuits 305 may be formed on the wafer 300.

Nodes 310, 315 are electrically coupled to the integrated circuit 305. In one embodiment, one or more wafer electrical test parameters associated with the integrated circuit 305 may be determined and accessed (at 210) using the nodes 310, 315. For example, a voltage or a current between the nodes 310, 315 may be accessed (at 210). Alternatively, a logical wafer electrical test parameter may be accessed (at 210). For example, one or more input bits representing logical 1s or 0s may be asserted at the node 310 and one or more output bits representing logical 1s or 0s may be read out from the node 315. In this example, the input bits, the output bits, or both sets of bits may constitute the wafer electrical test parameters.

A plurality of group parameters associated with a plurality of tool groups is determined and provided (at 220) to the corresponding tool groups. For example, the plurality of group parameters may be determined by the electrical parameters controller 135 shown in FIG. 1. In one embodiment, the plurality of group parameters may be formed based on a comparison of the wafer electrical test parameters and predetermined target values. For example, the currents and/or voltages measured between the nodes 310, 315 may be compared to target values of the currents and/or voltages. If the measured values are within a tolerance or allowable range of the target values, the target values used to form the integrated circuit 305 may be provided (at 220) to the corresponding tool groups. However, if the measured values are not within the tolerance or allowable range of the target values, the target values used to form the integrated circuit 305 may be modified and the modified target values provided (at 220) to the corresponding tool groups. A model may be used to determine the modified target values. In this embodiment, the target values constitute at least a portion of the group parameters.

Referring back to FIG. 2, a plurality of metrics associated with a plurality of tool groups is then accessed (at 230). For example, a supervisory controller 140(1-2) may access a plurality of metrics determined by the metric determination devices 125(1-2). The tool groups and/or metrics may be formed based on structures formed in or on the wafer 300.

Figure 4:
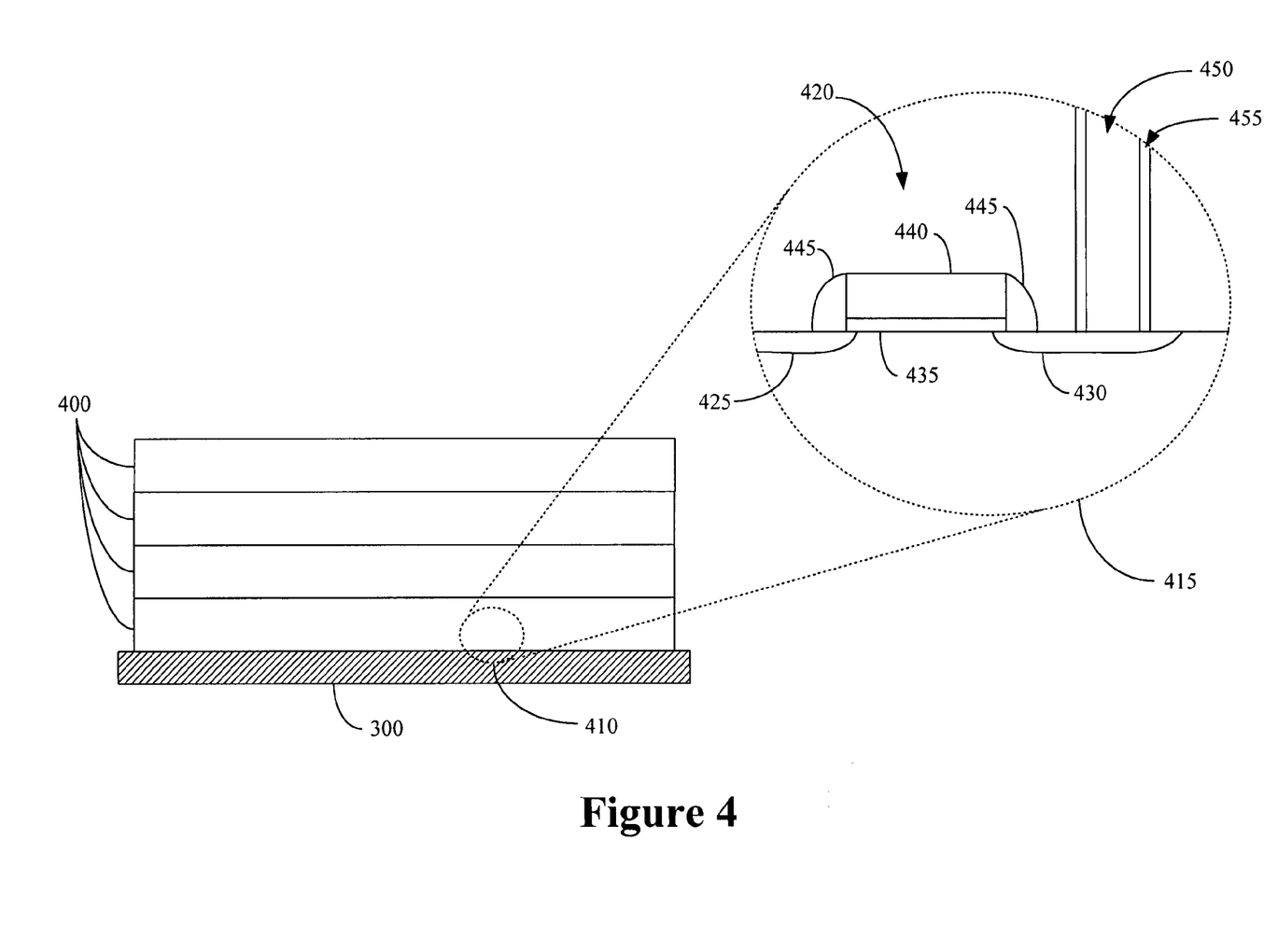
FIG. 4 conceptually illustrates a plurality of layers formed above the wafer, in accordance with the present invention.

FIG. 4 conceptually illustrates a plurality of layers 400 formed above the wafer 300. Although individual structures are not shown within the layers 400, each of the layers 400 may include a variety of structures including, but not limited to transistors, resistors, capacitors, diodes, vias, conductive traces or lines, and the like. These structures may be used to form various integrated circuits on the wafer 300, such as the integrated circuit 305 shown in FIG. 3. In one embodiment, tool groups include tools that were used to form the layers 400 and/or the structures formed in or on the respective layers 400. Alternatively, one or more tool groups may include tools used to form individual structures, groups of structures formed in or on a layer 400, structures formed in more than one layer 400, or any other desirable grouping criteria. For example, a portion 410 of one of the layers 400 is shown in an expanded view 415. The expanded view 415 shows a transistor 420 including a source region 425, a drain region 430, a gate insulation layer 435, a gate 440, and sidewalls 445. A via 450 including a thin film 455 is used to provide electrical contact to the drain region 430. One or more tool groups may include tools used to form some or all of the structures shown in the expanded view 415. For example, via 450 and the thin film 455 may be formed using an etching tool, a thin film tool, a deposition tool, a planarization tool, and the like. Accordingly, these tools may be combined to form a tool group.

A metric indicative of processing used by tools in the tool group to form via 450 and the thin film 455 may be formed and accessed (at 230). For example, the metric may be formed by combining measurements of the thickness of the thin film 455, a width and/or a height of the via 450, properties of voids (not shown) that may be formed between the material used to form the via 450 and the thin film 455, and the like. Other metrics may also be formed and accessed (at 230) based on structures and/or layers formed on the wafer 300.

A plurality of tool parameters may then be determined and provided (at 240) to the corresponding tools in the tool groups. The plurality of tool group parameters accessed (at 230) and the metrics provided (at 220) may be used by the supervisory controllers 140(1-2) to control operation of various tools by providing appropriate tool parameters. In one embodiment, the plurality of tool parameters are compared to target values, which may be included in the tool group parameters provided (at 220). For example, a thickness of the thin film 455, a width of via 450, and/or a height of via 450 may be compared to target values of these parameters provided (at 220). If the measured values are within a tolerance or allowable range of the target values, the target values used to form the thin films 455 and/or via 450 may be provided (at 240) to the corresponding tools as the tool parameters. However, if the measured values are not within the tolerance or allowable range of the target values, the target values used to form the thin films 455 and/or via 450 may be modified and the modified target values provided (at 240) to the corresponding processing tools. A model may be used to determine the modified target values.

One or more wafers may be processed (at 250) by the tools using the provided tool parameters. For example, a thin film tool may use the provided (at 240) target value to form a thin film 450 on a subsequent wafer 300 that is closer to the target value. By coordinating the determination of tool group parameters and tool parameters as discussed above, the efficiency of the processing may be improved. Furthermore, wafers processed using the provided parameters may include structures that are better able to meet the combined design and/or performance requirements of both the individual structures formed on the wafer and the global properties of the functional elements formed from these structures.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

accessing, at a first controller, a plurality of first metrics indicative of processing performed on a wafer by a plurality of tool groups, each tool group comprising a plurality of tools, a first portion of the plurality of the first metrics being determined by a plurality of first measurement tools that each perform measurements on the wafer after processing by a corresponding one of the plurality of tool groups and a second portion of the plurality of first metrics being determined by at least one end-of-line wafer electrical test performed on the wafer following processing by the plurality of tool groups;

providing, from the first controller, at least one tool group parameter to a plurality of second controllers, each second controller being configured to control one of the plurality of tool groups, said at least one tool group parameter being determined by the first controller based on the plurality of first metrics;

accessing, at the plurality of second controllers associated with the tool groups, a plurality of second metrics, each second metric being provided directly to the plurality of second controllers by said at least one first measurement tool, each second metric being determined by a corresponding one of said at least one first measurement tool and being indicative of processing performed on the wafer by the plurality of tools in the corresponding tool group; and providing, from the second controllers, at least one tool parameter to at least one tool in each of the plurality of tool groups based on the second metric associated with the tool group and the at least one tool group parameter provided to the second controllers by the first controller.

2. The method of claim 1, wherein accessing the first portion of the plurality of first metrics comprises accessing at least one first metric provided by at least one of a metrology tool and a wafer electrical test tool.

3. The method of claim 1, wherein accessing the plurality of second metrics comprises accessing a plurality of second metrics provided directly to the second controllers by at least one of a metrology tool and a wafer electrical test tool.

4. The method of claim 1, wherein accessing the plurality of second metrics associated with the corresponding plurality of tool groups comprises accessing a plurality of second metrics associated with a corresponding plurality of tool groups including tools used to form at least one structure on the wafer.

5. The method of claim 4, wherein accessing the plurality of second metrics associated with the corresponding plurality of tool groups comprises accessing a plurality of second metrics associated with a corresponding plurality of tool groups including tools used to form at least one structure in or on at least one layer formed on the wafer.

6. The method of claim 1, wherein accessing the plurality of second metrics associated with the corresponding plurality of tool groups comprises accessing a plurality of second metrics associated with a corresponding plurality of tool groups including at least one of a deposition tool, an etching tool, an implant tool, a polishing tool, a planarization tool, and a thin-film tool.

7. The method of claim 1, wherein providing the at least one tool group parameter to each of the plurality of tool groups comprises providing a target value for each of the plurality of second metrics.

8. The method of claim 1, wherein providing the at least one tool group parameter to each of the plurality of tool groups comprises providing the at least one tool group parameter to each of the plurality of tool groups based on at least one second metric.

9. The method of claim 1, wherein providing the at least one tool parameter to the at least one tool in each of the plurality of tool groups comprises comparing the second metric and the provided tool group parameter.

10. The method of claim 1, wherein providing the at least one tool parameter to at least one tool in each of the plurality of tool groups comprises providing the at least one tool parameter to at least one tool in a tool group based upon at least one second metric associated with at least one other tool group.

11. The method of claim 1, wherein providing at least one tool group parameter to each of the plurality of tool groups comprises providing at least one tool group parameter to each of the plurality of tool groups based on a model.

12. The method of claim 1, wherein providing the at least one tool parameter to the at least one tool in each of the plurality of tool groups comprises providing at least one tool parameter to at least one tool in each of the plurality of tool groups based on a model.

13. The method of claim 1, further comprising processing at least one wafer in the plurality of tool groups based on the tool parameters provided to the tools in the plurality of tool groups.

14. An apparatus, comprising:
means for accessing at a first controller, a plurality of first metrics indicative of processing performed on a wafer by a plurality of tool groups, each tool group comprising a plurality of tools, a first portion of the plurality of the first metrics being determined by a plurality of first measurement tools that each perform measurements on the wafer after processing by a corresponding one of the plurality of tool groups and a second portion of the plurality of first metrics being determined by at least one end-of-line wafer electrical test performed on the wafer following processing by the plurality of tool groups;

means for providing, from the first controller, at least one tool group parameter to a plurality of second controllers, each second controller being configured to control one of the plurality of tool groups, said at least one tool group parameter being determined by the first controller based on the plurality of first metrics;

means for accessing, at the plurality of second controllers associated with the tool groups, a plurality of second metrics, each second metric being provided directly to the plurality of second controllers by said at least one first measurement tool, each second metric being determined by a corresponding one of said at least one first measurement tool and being indicative of processing performed on the wafer by the plurality of tools in the corresponding tool group; and means for providing, from the second controllers, at least one tool parameter to at least one tool in each of the plurality of tool groups based on the second metric associated with the tool group and the at least one tool group parameter provided to the second controllers by the first controller.

15. An apparatus, comprising:
at least one first measurement tool and a plurality of second measurement tools;
at least one first controller configured to:
 access a plurality of first metrics indicative of processing performed on a wafer by a plurality of tool groups, each tool group comprising a plurality of tools, a first portion of the plurality of the first metrics being determined by a plurality of first measurement tools that each perform measurements on the wafer after processing by a corresponding one of the plurality of tool groups and a second portion of the plurality of first metrics being determined by at least one end-of-line wafer electrical test performed on the wafer following processing by the plurality of tool groups; and
 determine at least one tool group parameter based on the plurality of first metrics; and
a plurality of second controllers communicatively coupled to said at least one first controller, the second controllers being configured to:

access a plurality of second metrics, each second metric being provided directly to the plurality of second controllers by said at least one first measurement tool, and each second metric being determined by a corresponding one of said at least one first measurement tool and being indicative of processing performed on the wafer by the plurality of tools in the corresponding tool group;

receive said at least one tool group parameter from the first controller; and provide at least one tool parameter to at least one tool in each of the plurality of tool groups based on the second metric associated with the tool group and the at least one tool group parameter provided to the second controllers.

16. The apparatus of claim 15, wherein the first controller is configured to access a plurality of first metrics provided by at least one of a metrology tool and a wafer electrical test tool.

17. The apparatus of claim 15, wherein the plurality of second controllers are configured to access a plurality of second metrics provided directly to the plurality of second controllers by at least one of a metrology tool and a wafer electrical test tool.

18. The apparatus of claim 15, wherein the plurality of second controllers are configured to access a plurality of second metrics associated with a corresponding plurality of tool groups including tools used to form at least one structure on the wafer.

19. The apparatus of claim 18, wherein the plurality of second controllers are configured to access a plurality of second metrics associated with a corresponding plurality of tool groups including tools used to form at least one structure in or on at least one layer formed on the wafer.

20. The apparatus of claim 15, wherein the plurality of second controllers are configured to access a plurality of second metrics associated with a corresponding plurality of tool groups including at least one of a deposition tool, an etching tool, an implant tool, a polishing tool, a planarization tool, and a thin-film tool.

21. The apparatus of claim 15, wherein the first controller is configured to provide a target value for each of the plurality of second metrics.

22. The apparatus of claim 15, wherein the first controller is configured to provide the at least one tool group parameter to each of the plurality of tool groups based on at least one second metric.

23. The apparatus of claim 15, wherein the second controllers are configured to compare the second metric and the provided tool group parameter.

24. The apparatus of claim 15, wherein the second controllers are configured to provide the at least one tool parameter to at least one tool in a tool group based upon at least one second metric associated with at least one other tool group.

25. The apparatus of claim 15, wherein the first controller is configured to provide at least one tool group parameter to each of the plurality of tool groups based on a model.

26. The apparatus of claim 15, wherein the second controllers are configured to provide at least one tool parameter to at least one tool in each of the plurality of tool groups based on a model.

27. The apparatus of claim 15, further comprising a plurality of tools for processing at least one wafer based on the provided tool parameters.

* * * * *